D. Jordan,
Dovetailing Mach.
No. 99,446. Patented Feb. 1, 1870.

Witnesses
D. H. Shinney
A. J. Tibbits

A. S. & J. Grantler,
Assignees of
Diedrich Jordan
Inventor
By his Attorney
Thos. E. Earl

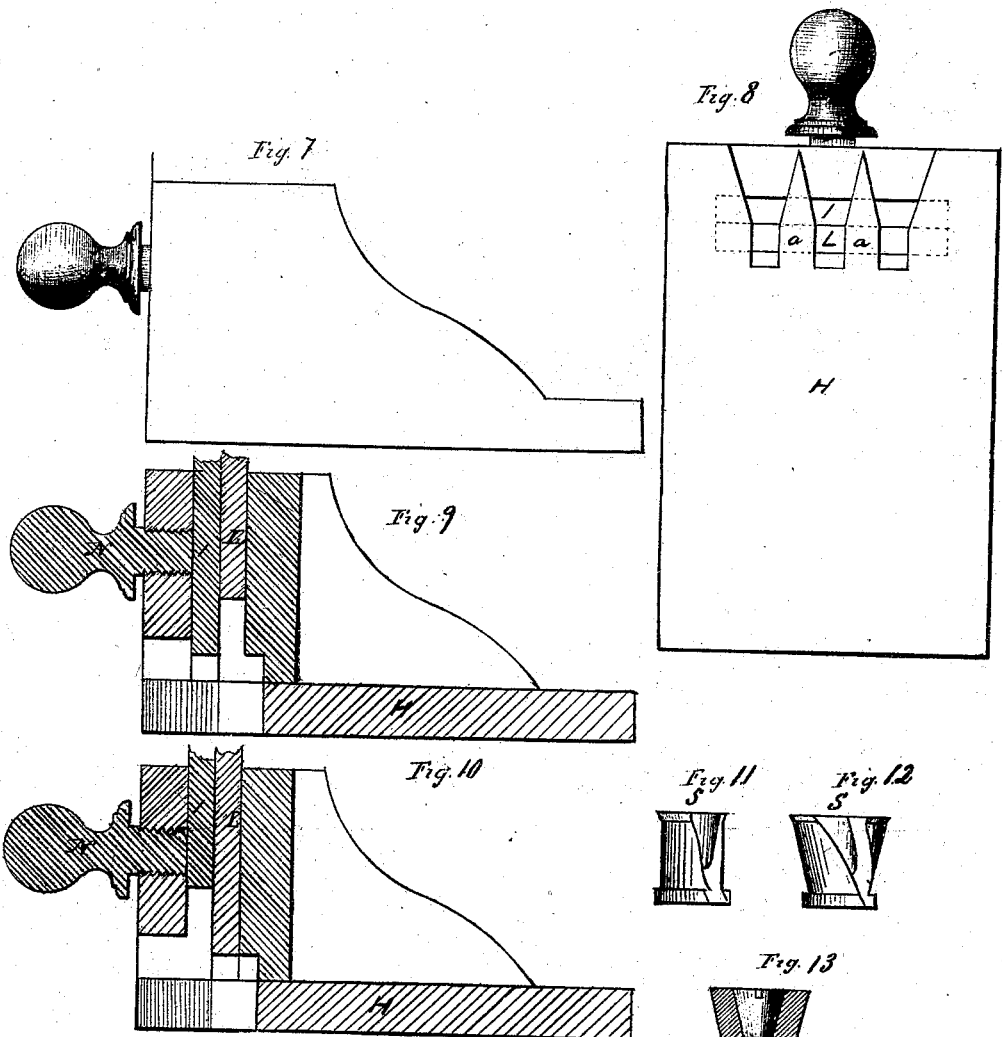

United States Patent Office.

DEDRICK JORDAN, OF CHARLESTOWN, MASSACHUSETTS, ASSIGNOR TO A. S. & J. GEAR & CO., OF NEW HAVEN, CONNECTICUT.

*Letters Patent No. 99,446, dated February 1, 1870.*

IMPROVEMENT IN DOVETAILING-MACHINES.

The Schedule referred to in these Letters Patent and making part of the same.

*To all whom it may concern:*

Be it known that I, DEDRICK JORDAN, of Charlestown, in the county of Middlesex, and State of Massachusetts, have invented a new Improvement in Dovetailing-Apparatus; and I do hereby declare the following, when taken in connection with the accompanying drawings, and the letters of reference marked thereon, to be a full, clear, and exact description of the same, and which said drawings constitute part of this specification, and represent, in—

Figure 1:
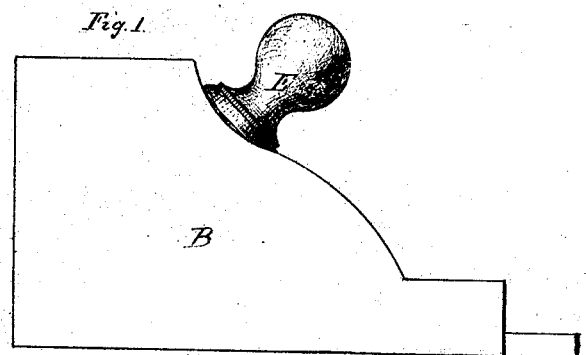
Figure 2:
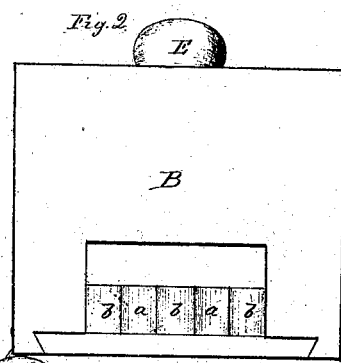
Figure 3:
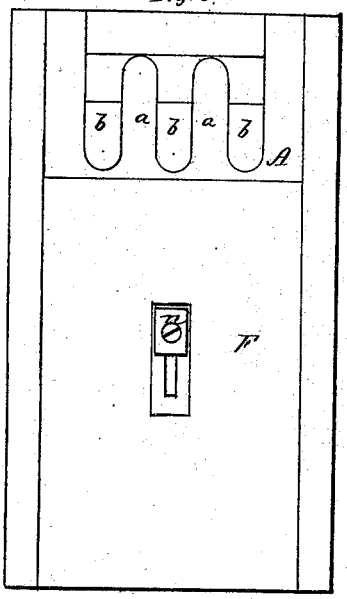
Figure 4:
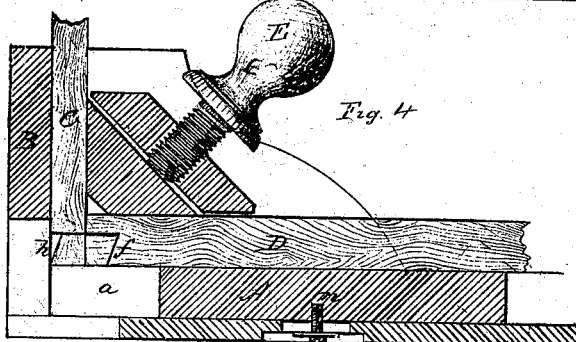
Figure 5:
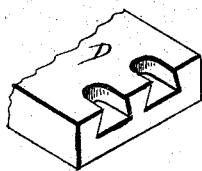

Figure 1, a side view.
Figure 2, a front view.
Figure 3, a bottom view.
Figure 4, a longitudinal section.
Figure 5, the mortise, and
Figure 6, the tenon of the dovetail (These several figures show the manner of forming what is known as blind-dovetailing.)

Figure 7, a side view.
Figure 8, a bottom view.
Figures 9 and 10, longitudinal sections, illustrating the manner of forming the common or open dovetails.
Figures 11, 12, and 13, the arrangement of the solid cutters, and
Figure 14, the arrangement of the cutter-knives for doing the same.

This invention is designed as an attachment for the machine known as the "Gear Moulding-Machine," patented November 8, 1853, and extended for seven years, the object being to dovetail the work upon the said machine; and The invention consists in the construction of a form or pattern, so that by the same form or pattern, a dovetail tenon and mortise may both be formed.

I will proceed, first, to describe the apparatus for blind dovetailing, as illustrated in fig. 1 to fig. 6, inclusive.

A is the form of pattern, constructed with projections, $a$, and recesses, $b$, the said recesses and projections corresponding the one to the other.

The said form is arranged in a clamping-frame, B, so that one piece of wood, C, for the tenon-part, may be set in vertically, the other part, D, for the blind-mortise, set in at right angles to the part C, as seen in fig. 4, and the two parts securely held by a clamp, D, acted upon by a screw, E.

The work thus held upon the form is placed upon the machine, so as to pass on to the guide and cutter, as seen in fig. 13, the guide passing into the recesses $b$, and, as the form is moved, working around the projections into a second recess, and so on.

Figure 6:
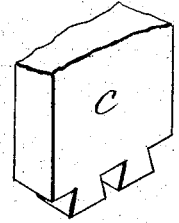

The cutter, passing through the piece C, cuts the tenons, as seen in fig. 6, and passing still further, cuts the mortise, as seen in fig. 5. The end of the mortise being inclined, as at $f$, fig. 4, corresponds to the inclination of the cutter; then, as the form passes out from the recess around the end of the projection $f$, the tenon will be dressed around the outside, corresponding to the former, and inclination of the mortise, as seen in fig. 4, and thus continuing until the whole width of the work has been dovetailed, then the parts removed, and they will fit together in the most perfect manner.

The depth of the mortise is governed by a guide, F, arranged upon the bottom of the form A, so as to be moved longitudinally thereon, and fixed by a set-screw, $n$.

This guide is moved forward, so that the cutter can enter the recesses $b$ only the required distance, as seen in fig. 4.

It should here be remarked that the outside of the vertical part C should in position correspond to the extreme ends of the projections $a$, as seen in fig. 4.

By this construction, both parts are dovetailed at the same operation.

I will now proceed to describe the manner of making common dovetails.

H is a form, substantially the same as the form A, with this difference; that the projections $a$ instead of being bevelled at their ends, are bevelled corresponding to the bevel of the mortise, and the two pieces I and L, to be dovetailed, are arranged vertically over the form, and clamped therein by a set-screw, N, and but one part can be dovetailed at the same time, say that of the tenons L.

This part is set down on to the form, so as to come back of the bevelled portions of the projections $a$, where the recess is parallel, as seen in fig. 8.

The same cutters as before described, as shown in figs. 12 and 13, are used, and the former passed on to the cutter in like manner as before. The cutter, running entirely through the wood, cuts the common dovetail tenon, passing from recess to recess, until all the tenons are cut.

To cut the other part or mortise, I, a straight cutter, as seen in fig. 11 is required, and the piece to be cut is placed upon the bevelled portion of the projection $a$, then the former passed on to the cutter, through the several recesses, until all are cut. Then the two parts correspond to each other, as in common dovetailing.

The cutters S, shown in figs. 11 and 12, are cylindrical in form, the one of equal diameter, and the other an inverted cone, the cutting-edge being formed by taking away a portion of the metal, and the cutter is held on to the spindle by a conically-headed screw, M, fitting a corresponding conically-shaped seat in the cutter; or the cutters may be in the form of knives, clamped into a cutter-head, as in fig. 14, in similar manner as in the gear moulding-machine.

I am aware of the patent of Hazard Knowles, January 2, 1865, for planing-machine, and do not broadly claim the use of conical-headed bolts for the purpose of securing the cutter-head to the arbor.

I claim as my invention—

1. The form or pattern, constructed substantially as herein described, and combined with the clamping-device to hold the two pieces to be dovetailed, and so as to be presented to the cutter and guided around the same, in the manner set forth.

2. In combination with the form or pattern, constructed as herein described, the cutters S, constructed so as to be attached to the spindle by the conical-headed screw M, that portion of the spindle beneath the head forming the guide, against which the former is moved, as herein described.

DEDRICK JORDAN.

Witnesses:
P. E. MARTIN,
JOHN H. BUTLER.